Patented July 10, 1951

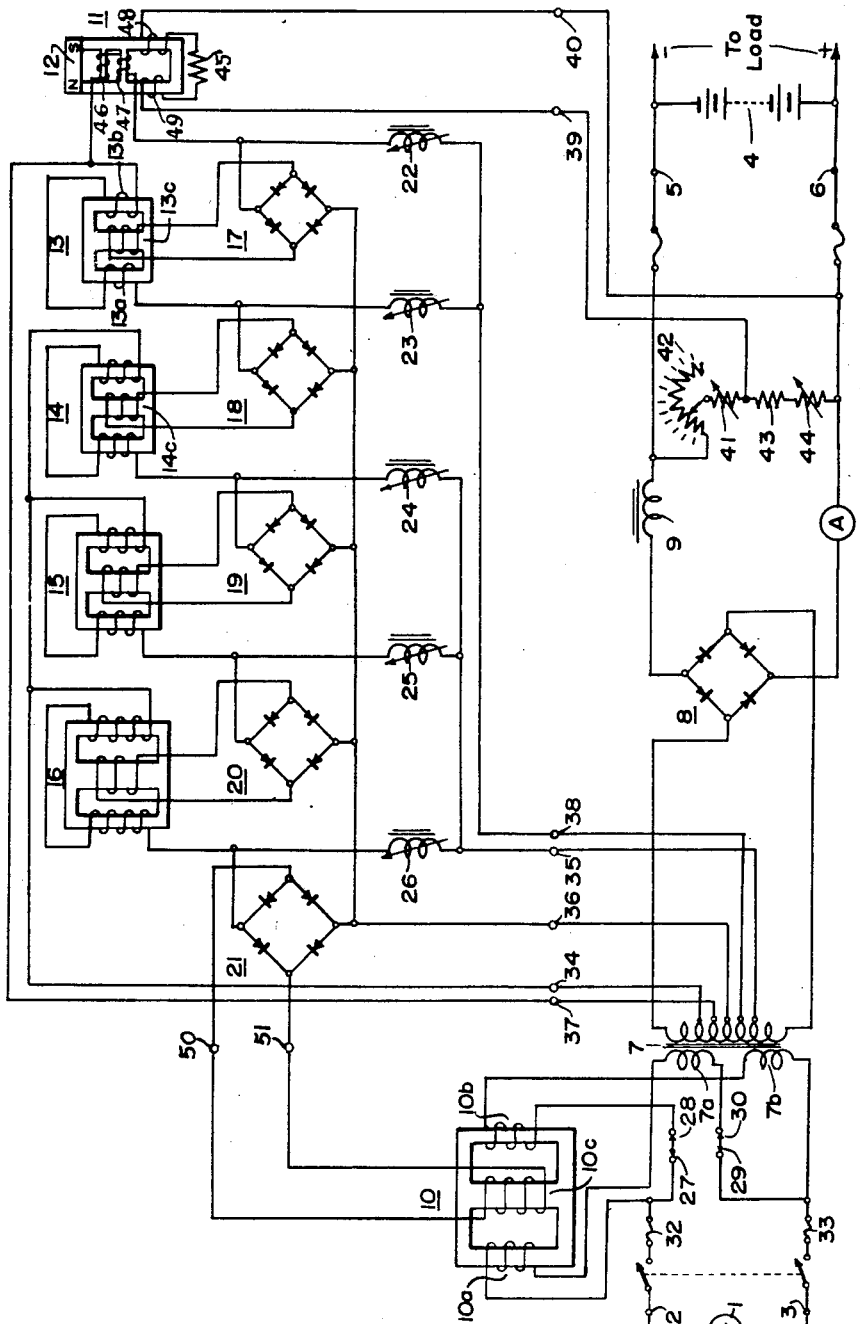

2,560,284

UNITED STATES PATENT OFFICE 2,560,284

VOLTAGE REGULATING SYSTEM

Otho D. Grandstaff, Oak Park, Ill., assignor to Automatic Electric Laboratories, Inc., Chicago, Ill., a corporation of Delaware Application October 26, 1945, Serial No. 624,775

11 Claims. (Cl. 321—25)

The present invention pertains in general to voltage regulating systems; and, in particular, to improved apparatus and circuit arrangements for regulating the output voltage of battery chargers or battery eliminators.

When a rectifier is used in conjunction with a battery to supply a direct current load circuit from an alternating current source, it is desirable that the rectifier have a load voltage vs. load current characteristic which drops very slightly from no load to full load, and then drops very rapidly, in order to prolong the life of the battery. With such a load characteristic practically the entire load will be carried by the rectifier, load current being taken from the battery only when the capacity of the rectifier is exceeded. With such a load characteristic it is necessary to compensate for variations in the voltage of the alternating current source in order to eliminate unnecessary charging and discharging of the battery with consequent deterioration thereof.

In order to obtain a constant voltage characteristic, particularly in a battery charger using dry-disc type rectifiers, some form of voltage regulator is required. Variations in the voltage of the alternating current source have heretofore been compensated for by the use of saturated and unsaturated chokes in combination with condensers connected in the input circuit of the charger. This method of compensating for line voltage variations is subject to the objection that it is satisfactory only when the alternating current supply frequency is constant, and also it requires that high reactive currents be drawn from the supply circuit even at no load. Saturable reactors have heretofore been used to compensate for the internal drops of the dry-disc rectifiers, the transformer used in conjunction therewith, and the filter reactors, which drops normally cause the output voltage to vary with the load current. Usually at least a portion of the load current flows through a saturating winding on the regulating reactor. This method requires that the characteristics of the regulating reactor have a predetermined relation to the load characteristics of the charger without regulation. Since the characteristics of dry-disc rectifiers vary considerably with use it is necessary to alter the characteristics of the regulating reactor from time to time, as by the use of tapped windings thereon, to compensate for ageing of the dry-disc rectifiers.

It is accordingly an object of the present invention to provide a voltage stabilizing system for a battery charger which will compensate for both line voltage variations and internal voltage drops independently of the supply frequency or ageing of the rectifier elements.

A further object of the invention is to provide a voltage regulating system using a saturable reactance amplifier wherein the amplifier gain is controlled in accordance with the load on the system, whereby improved regulation is obtained.

Another object of the invention is to provide an improved form of saturable reactance amplifier, for use in a voltage regulating system, in which a higher degree of amplification is obtained than in previously proposed reactance amplifiers through the use of a novel balanced circuit arrangement.

A feature of the invention is the use of a permanent magnet as a standard of comparison in a voltage regulating system; which is accomplished by creating a magneto-motive force, proportional to the voltage which is to be regulated, in a magnetic structure including a permanent magnet; and governing the regulator in accordance with the difference between said magneto-motive force and the magneto-motive force of said permanent magnet.

Another feature of the invention is a novel circuit arrangement which enables the charger to be readily adapted to operate on either of two supply voltages.

The above objects and features will be more fully appreciated upon a further perusal of the specification taken in conjunction with the accompanying drawing which illustrates a preferred embodiment of the invention in the form of a schematic circuit diagram.

Described briefly, the invention comprises a conventional battery charger modified by the connection of a saturable reactor in the input circuit thereof; a standard of comparison comprising a magnetic structure including a permanent magnet and an electromagnet which is connected across the output circuit of the charger so as to produce a magneto-motive force, which is proportional to the output voltage, in said magnetic structure; and a saturable reactance amplifier having its input circuit connected to a further winding on said magnetic structure, so as to be governed in accordance with the difference in the magneto-motive forces of said permanent magnet and said electromagnet, and having its output circuit connected to the saturating winding on said first reactor; whereby the impedance of said first reactor is varied so as to maintain the output voltage substantially constant despite variations in input voltage, load current, ageing of the rectifiers, etc.

Referring now to the drawing, there is shown a source of alternating current 1 connected to the input terminals 2 and 3 of the charger, and a battery 4 connected in multiple with a load circuit to the output terminals 5 and 6. Between the input and output terminals there is shown a conventional charger comprising a transformer 7, a full wave dry-disc type rectifier 8, and a filter reactor 9. A regulating reactor 10 is connected in series with the primary windings of transformer 7 and the alternating current source 1. A portion of the output voltage of the charger is applied to windings on a control device 11 which compares the magneto-motive force produced by these windings with that of a permanent magnet 12 and governs the impedance of further windings thereon in accordance with the difference in the two magneto-motive forces. The impedance of these further windings govern the voltage applied to the input of a saturable reactance amplifier comprising saturable reactors 13 through 16, full wave dry-disc rectifiers 17 through 21, and reactors 23 through 26. The output circuit of the reactance amplifier is connected to the saturating winding on the regulating reactor 10.

The charger is arranged for use on either 110 v. A. C. or 220 v. A. C. by simply changing the strapping of terminals 27 through 30. These terminals are shown strapped for 110 volt operation, in which case terminal 2 is connected through one contact of switch 31, fuse 32, windings 10a and 7a, the strap between terminals 29 and 30, fuse 33, and another contact of switch 31 to terminal 3. Windings 10b and 7b are connected in multiple with windings 10a and 7a through the strap connected between terminals 27 and 28. For 220 volt operation, the straps shown are removed and terminals 28 and 30 are strapped, in which case windings 10a, 7a, 10b, and 7b are connected in series across the supply circuit. The winding directions on the regulating reactor 10, and on saturable reactors 13 through 16, are such that the magnetic fluxes produced in the core by the two windings on the outer legs cancel each other in the center leg. The impedance of the windings on the outer legs of each of these reactor cores varies with the degree of saturation of the core, which is controlled by the amount of direct current flowing in the winding on the center leg.

The control device 11 is also a saturable reactor but differs in construction and operation from the other saturable reactors 10 and 13 through 16. The control device comprises a magnetic core having four legs joined by two yokes in which the two inner legs are restricted in cross section to permit ready saturation thereof. One of the outer legs of the core comprises a permanent magnet 12 which may be shifted with respect to the yokes to vary the area with which it is in contact therewith for a purpose to be subsequently described. Variable impedance winding 46 is provided on one of the inner legs, and variable impedance winding 47 on the other. These windings, hereinafter termed A. C. windings, are connected in series so that the magnetic flux produced by current flowing in the series circuit flows in opposite directions in the two inner legs of the core; whereby these windings are incapable of producing a difference in magneto-motive force between the two yokes and thus will not produce a demagnetizing effect on the permanent magnet when energized with alternating current. Two additional windings 48 and 49, hereinafter termed D. C. saturating windings, are provided; one on each yoke between the remaining outer leg and the inner legs. These windings are connected in series aiding relation and may, if desired, be replaced by a single winding on said remaining outer leg. A resistor 45, which has a negative temperature coefficient, is connected in series with the aforesaid D. C. windings to compensate for the variation in resistance thereof with changes in temperature. This resistor is preferably imbedded in the core of the control device 11. Alternatively, the D. C. windings may be wound with wire having a low temperature coefficient.

When the D. C. saturating windings 48 and 49 of the control device 11 are energized by connecting a source of direct current across terminals 39 and 40, with the positive terminal of the source connected to terminal 40, the fluxes produced by these windings and by the permanent magnet will be aiding in the outer legs and yokes of the core but will be opposing in the two inner legs. For a predetermined voltage across the D. C. windings, determined by the strength of the permanent magnet, the aforesaid fluxes will cancel each other in the inner legs of the core and consequently the A. C. variable impedance windings 46 and 47 thereon will have a maximum impedance. If the voltage across the D. C. windings is then either increased or decreased a net flux will be produced in the inner legs in accordance with the difference between the magneto-motive forces of the permanent magnet and the D. C. windings. Due to saturation of the inner legs, the impedance of the A. C. windings will decrease slowly at first and then very rapidly to a minimum value as the voltage across the D. C. windings is gradually increased or decreased from said predetermined value.

The D. C. windings of the control device 11 are bridged across the output terminals 5, 6 of the charger in series with resistors 41 and 42 and in shunt with resistors 43 and 44, whereby the impedance of the A. C. windings of the control device is caused to vary in accordance with the output voltage of the charger. The A. C. windings of the control device are bridged across symmetrically spaced taps on the secondary winding of transformer 7, in series with variable reactor 22, via terminals 37 and 38. The A. C. terminals of bridge rectifier 17 are connected between the midpoint of the secondary winding of transformer 7 and the junction between reactor 22 and the A. C. windings of control device 11. The D. C. terminals of rectifier 17 are connected to the saturating winding 13c of reactor 13. The A. C. windings 13a and 13b of reactor 13 are similarly bridged across the aforesaid symmetrically spaced taps on transformer 7 in series with reactor 23. The A. C. terminals of bridge rectifier 18 are connected between the center tap on transformer 7 and the junction between winding 13a and reactor 23. The D. C. terminals of rectifier 18 are connected to the saturating winding 14c of reactor 14. The remaining reactors are similarly connected in cascade. The succeeding stages of the reactance amplifier are energized from a second pair of spaced taps on the secondary winding of transformer 7 via terminals 34 and 35 because it is convenient to wind the reactors included in these stages with finer wire than that used in the initial stage and to impress a higher alternating potential thereon.

The control device 11 and the saturable reactance amplifier are preferably constructed as a sub-assembly which may readily be adjusted prior to the final assembly of the complete charging unit. The manner in which the adjustment of this sub-assembly is carried out will now be described in order to facilitate the understanding of the operation thereof. During the adjustment the terminals 34 and 35 are connected to a suitable source of alternating current, the midpoint of the source being connected to terminal 36. Terminals 37 and 38 are also connected to a suitable source of alternating current having its midpoint connected to terminal 36. A transformer having its secondary tapped at ±15 v., ±2.5 v., 0, ∓2.5 v., ∓15 v., for example, may be employed for this purpose. Terminals 39 and 40 are connected to the negative and positive terminals, respectively, of a source of direct current of variable voltage. The voltage between terminals 39 and 40 is initially adjusted to a predetermined value which is less than the minimum voltage of the battery with which the charger is to be used. For example, if the charger is to be used in conjunction with a telephone exchange battery which has a nominal voltage of 48 volts, the voltage between terminals 39 and 40 will be initially adjusted to 42 volts. A direct current voltmeter is then connected across the saturating winding 13c of reactor 13. The strength of permanent magnet 12, which is initially magnetized to a higher degree than actually required, is now adjusted until a predetermined voltage appears across winding 13c. This may conveniently be accomplished by shifting the magnet 12 partially off of the core of the control device 11 to successively greater distances, and returning the magnet to its initial position between each shift, until the required voltage is obtained with the magnet in its normal position. After the strength of the magnet has thus been adjusted to the desired value it is rigidly secured to the core.

The variable reactors 22 through 26 are initially adjusted to the minimum value of inductance. The inductance of each of these reactors will then be less than that of the A. C. windings, such as 13a and 13b, of the corresponding saturable reactors. The inductance of reactor 22 is gradually increased. As the inductance of this reactor approaches that of the A. C. windings on the control device 11, the voltage across saturating winding 13c will decrease to a minimum value, and will then increase as the inductance of reactor 22 is further increased. The balance point is not sharply defined and it is therefore desirable to increase the inductance of reactor 22 until the voltage across winding 13c just starts to increase in order to obtain the maximum sensitivity. The voltmeter is then transferred to winding 14c and reactor 23 is adjusted in like manner after which reactors 24 and 25 are similarly adjusted. Since reactor 10 is not included in the sub-assembly a resistor may be connected across terminals 50 and 51 to replace winding 10c during the adjustment of the sub-assembly. After reactor 25 has been adjusted, as described above, the voltage across terminals 39 and 40 is increased slightly until the voltage across winding 13c decreases to its minimum value. The inductance of reactor 26 is then increased, starting from the minimum value, until the voltage across terminals 50 and 51 just starts to rise after passing through its minimum value.

After the sub-assembly has been adjusted as described in the preceding paragraph it is assembled with and connected to the other elements of the complete charging unit as illustrated. The fraction of the output voltage which is impressed on the D. C. windings of the control device 11 is determined by the values of resistors 41 through 44. Resistor 42 is calibrated in terms of output voltage to permit ready field adjustment of the charger to any desired output voltage within the working range of the charger, which may be 44 to 56 volts, for example. Resistors 41 and 44 are made adjustable to obtain correspondence between the calibration of resistor 42 and the output voltage. Resistors 41 and 44 are adjusted with a source of alternating current having a potential equal to the nominal value for which the charger is designed connected to the input thereof and with a battery having a potential equal to the nominal value for which the charger is designed connected to the output thereof. With resistor 42 set to the nominal value of output voltage indicated on its calibrated scale, resistors 41 and 44 are adjusted until the output current is approximately two-thirds the rated capacity of the charger.

Tests have shown that the output voltage will be maintained within ±2% of the desired nominal value, which is determined by the setting of resistor 42, for all loads within the capacity of the charger despite ±10% variations in input voltage, ±10% variations in frequency, or ageing of the rectifiers. Loads above the rated capacity of the charger will take current from the battery and lower its terminal voltage, but the battery will be recharged to the desired nominal voltage as soon as the load is decreased to a value within the capacity of the charger. Under normal conditions the current flowing in the D. C. windings of each of the reactors 10 and 13 through 16 is approximately midway between its minimum and maximum values when the impedance of the A. C. windings of the control device 11 is approximately midway between its minimum and maximum values. If the output voltage varies, due to variations in input voltage, load current, etc., the net magnetic flux flowing in the inner legs of the control device varies accordingly, thereby affecting the impedance of the A. C. windings on these legs in the proper sense to vary the impedance of the regulating reactor 10 in a direction which will cause the voltage impressed on transformer 7 to either increase or decrease sufficiently to compensate for the initial variation. By making the gain of the saturable reactance amplifier very high almost complete compensation is effected.

The alternating current supply for the reactance amplifier may, if desired, be obtained directly from the input terminals of the charger and might include an A. C. voltage regulator. However, it has been found that improved regulation is obtained when the reactance amplifier is supplied from the transformer 7 due to the fact that the voltage impressed on this transformer increases with increased load thereby providing increased gain in the reactance amplifier for increased loads. A greater variation in the impedance of the regulating reactor 10, for a given variation in load, is thus obtained.

While a particular embodiment of the invention has been illustrated it is to be understood that numerous modifications may be incorporated therein without departing from the true spirit and scope of the invention as defined in the appended claims.

What is claimed is:

1. A balanced saturable reactance amplifier for use in a voltage regulating system comprising a source of alternating current, a plurality of saturable reactors, a plurality of other reactors, a variable impedance winding on each of said first reactors connected across said source in series with a corresponding one of said second reactors, a plurality of bridge type rectifiers, a connection from a tap on said source to one A. C. terminal of each of said rectifiers, a connection from each junction between the first and second reactors to the other A. C. terminal of a corresponding one of said rectifiers, a saturating winding on each of said first reactors, connections between the saturating winding on each reactor succeeding the first and the D. C. terminals of the rectifier corresponding to the preceding saturable reactor, an input circuit connected to the saturating winding on the first saturable reactor, and an output circuit connected to the D. C. terminals of the rectifier corresponding to the last saturable reactor.

2. A multi-stage balanced saturable reactance amplifier for use in a voltage regulating system in which each intermediate stage comprises a saturable reactor, a linear reactor, and a rectifier, a source of alternating current having a tap, a variable impedance winding on said saturable reactor connected across said source in series with said linear reactor, an output circuit including said rectifier connected between said tap and the junction between said linear reactor and said variable impedance winding, and a saturating winding on said first reactor connected to the output circuit of the preceding stage of the amplifier.

3. In a regulated rectifying system, a source of alternating current, a direct current load circuit, a transformer having two primary windings and a secondary winding, a rectifier connected between the secondary winding and said load circuit, a regulating reactor including two variable impedance windings for controlling the voltage impressed on said rectifier, a connection between one terminal of each of said variable impedance windings and one terminal of a corresponding one of said primary windings, a connection between each of the terminals of said source and one of the other terminals of a corresponding pair of said connected windings, and circuit means for either connecting the remaining two terminals of said connected pairs of windings together or for connecting each of said remaining terminals to a corresponding one of the terminals of said source, whereby said connected pairs of windings may readily be connected either in series or in parallel to adapt the system for operation on either one of two values of alternating current supply voltage.

4. In a regulated rectifying system, a source of alternating current, a direct current load circuit, a transformer having two primary windings and a secondary winding, a rectifier connected between the secondary winding and said load circuit, a regulating reactor including two variable impedance windings for controlling the voltage impressed on said rectifier, a connection between one terminal of each of said variable impedance windings and one terminal of a corresponding one of said primary windings, a connection between each of the terminals of said source and one of the other terminals of a corresponding pair of said connected windings, the remaining two terminals of said connected pairs of windings being connected together when the system is operated on one value of alternating current supply voltage and being connected to corresponding ones of the terminals of said source when the system is operated on a different value of alternating current supply voltage.

5. In a regulated rectifying system, a source of alternating current, a direct current load circuit, a transformer having two primary windings and a secondary winding, a rectifier connected between the secondary winding and said load circuit, a regulating reactor including two variable impedance windings for controlling the voltage impressed on said rectifier, each of the primary windings of said transformer being connected across said source in series with a corresponding one of said variable impedance windings.

6. A control device for controlling an impedance controlled circuit, said control device comprising a magnetic core having four parallel branches, one branch of said core being permanently magnetized, two other branches of said core being reduced in cross-section to permit ready saturation thereof, a winding on each of the latter branches, said windings being connected in said impedance controlled circuit so that the magnetic flux produced by current flowing therein flows in opposite directions in said two branches, a winding of the remaining branch of said core connected to a direct current circuit, a variable source of current in said direct current circuit for causing a magnetic flux to flow in said two branches which is in opposition to the magnetic flux produced therein by said permanently magnetized branch, thereby causing the impedance of said first two windings to vary in accordance with small deviations in said source.

7. A control device for controlling the impedance in a circuit having a core of restricted area that is readily saturated, a winding on said core included in the circuit to be controlled, a permanent magnet, a second core of greater area than said first core, a pair of yokes of high permeability joining the ends of said cores and said permanent magnet, said magnet normally producing a flux through said yokes to said first core to cause saturation thereof, a second winding associated with said second core included in a direct current circuit, a variable source of direct current in said direct current circuit causing said second winding to produce a magnetic flux in said first core in opposition to the flux produced therein by said permanent magnet, thereby, to reduce the saturation of said first core substantially to an unsaturated condition, variations in said direct current in said second winding changing the magnetic saturation of said first core, thereby, to reduce the impedance in the circuit of said first winding from a maximum value to a minimum value with small variation of current due to the differential action of the fluxes in said first core.

8. A control device for an impedance controlled circuit for regulating the impedance thereof, said control device comprising a magnetic core having at least three parallel branches, one branch of said core permanently magnetized, a second branch of said core reduced in cross-section to permit ready saturation thereof, a winding on said second branch connected in said impedance controlled circuit, a winding on the third branch of said core, means for causing a current flow in said last winding so as to produce a magnetic flux in said second branch which is in opposition to the magnetic flux produced therein by said permanently magnetized branch, thereby, to maintain normally said second branch substantially unsaturated, slight variations in said current flow causing said second branch to change rapidly from an unsaturated to a saturated condition due to the normally balanced condition in said second branch, thereby, to cause the impedance of said first winding to vary.

9. In a voltage regulating system, a source of alternating current, a direct current load circuit, a rectifier connected between said source and said load circuit, a control device comprising a single magnetic core having a saturable portion, a permanent magnet on said single core, a saturating winding on said single core connected across said load circuit and inducing magnetomotive force in said saturable portion in opposition to the magnetomotive force induced by said permanent magnet, the degree of magnetic saturation of said saturable portion determined by difference in magnetomotive force produced by said permanent magnet and sat saturable winding, a first variable impedance winding on said single core having its impedance varied in accordance with the degree of saturation in said saturable portion, and means comprising a regulating saturable reactor having a saturating winding responsively coupled only to said control device and having a variable impedance winding connected between said source and said rectifier for regulating the voltage impressed on said rectifier in accordance with the impedance of said first variable impedance winding from maintaining the load circuit voltage substantially constant.

10. In a voltage regulating system, a source of alternating current, a direct current load circuit, a rectifier connected between said source and said load circuit, a control device comprising a single magnetic core having a saturable portion, a fixed biasing means on said single core, a saturating winding on said single core connected across said load circuit inducing magnetomotive force in said saturable portion in opposition to the magneto motive force induced by said fixed biasing means, the degree of magnetic saturation of said saturable portion determined by a difference in magnetomotive force produced by said fixed biasing means and said saturating winding, a first variable impedance winding on said single core having its impedance varied in accordance with the degree of saturation in said saturable portion, and means comprising a regulating saturable reactor having a saturating winding responsively coupled only to said control device and having a variable impedance winding connected between said source and said rectifier for regulating the voltage impedance on said rectifier in accordance with the impedance of said first variable impedance winding for maintaining the load circuit voltage substantially constant.

11. In a voltage regulating system, a source of alternating current, a direct current load circuit, a rectifier connected between said source and said load circuit, a control device comprising a single magnetic core having a saturable portion, a permanent magnet on said single core, a saturating winding on said single core connected across said load circuit and inducing magnetomotive force in said saturable portion in opposition to the magnetomotive force induced by said permanent magnet, the degree of saturation of said saturable portion determined by a difference in magnetomotive force produced by said permanent magnet and said saturating winding, a variable impedance winding on said single core having its impedance varied in accordance with the degree of saturation in said saturable portion, a saturable reactance amplifier having a variable impedance output winding thereon and having an input winding coupled to said impedance winding of said control device, and a regulating saturable reactor having a saturating winding responsively coupled only to said saturable reactance amplifier and having a variable impedance winding thereon connected between said source and said rectifier for regulating the voltage impressed on said rectifier in accordance with the impedance of said output winding for maintaining the load circuit voltage substantially constant.

OTHO D. GRANDSTAFF.

REFERENCES CITED

The following references are of record in the file of this patent:

UNITED STATES PATENTS

| Number | Name | Date |
|---|---|---|
| 1,434,346 | Jonas | Oct. 31, 1922 |
| 1,788,152 | Dowling | Jan. 6, 1931 |
| 1,963,093 | Logan | June 19, 1934 |
| 2,036,708 | Logan | Apr. 7, 1936 |
| 2,040,768 | Edwards | May 12, 1936 |
| 2,068,188 | Logan | Jan. 19, 1937 |
| 2,084,870 | Schmidt | June 22, 1937 |
| 2,164,383 | Burton | July 4, 1939 |
| 2,170,193 | Godsey, Jr. | Aug. 22, 1939 |
| 2,179,299 | Murcek | Apr. 7, 1939 |
| 2,246,302 | Hauffe et al. | June 17, 1941 |
| 2,306,998 | Claesson | Dec. 29, 1942 |
| 2,331,131 | Moyer | Oct. 5, 1943 |
| 2,349,685 | Trucksess | May 23, 1944 |
| 2,371,395 | Keeling, Jr. | Mar. 13, 1945 |
| 2,381,715 | Boehlen et al. | Aug. 7, 1945 |

FOREIGN PATENTS

| Number | Country | Date |
|---|---|---|
| 766,593 | France | Apr. 16, 1934 |